United States Patent [19]

Edwards

[11] Patent Number: 4,993,276

[45] Date of Patent: * Feb. 19, 1991

[54] DRIVE ASSEMBLY WITH OVERSPEED BRAKE

[75] Inventor: Wallace L. Edwards, Stockton, Mo.

[73] Assignee: Superior Gear Box Company, Stockton, Mo.

[*] Notice: The portion of the term of this patent subsequent to Jan. 31, 2006 has been disclaimed.

[21] Appl. No.: 25,399

[22] Filed: Mar. 13, 1987

[51] Int. Cl.$^5$ .............................................. F04B 49/10
[52] U.S. Cl. .................................. 74/411.5; 74/606 R; 166/78; 188/184; 188/185
[58] Field of Search ............ 166/78; 74/411.5, 606 R; 188/184, 185

[56] References Cited

U.S. PATENT DOCUMENTS

| | | | |
|---|---|---|---|
| 2,080,952 | 5/1937 | Rathje | 74/411.5 |
| 2,171,171 | 8/1939 | Brauer | 166/78 |
| 2,174,115 | 9/1939 | Auld et al. | 255/19 |
| 2,327,962 | 8/1943 | Drake | 74/606 R |
| 3,205,726 | 9/1965 | Stoeckhicht | 74/411.5 |
| 3,318,550 | 5/1967 | Quenot | 188/185 |
| 3,485,109 | 12/1969 | Dunlap | 74/409 |
| 3,543,598 | 12/1970 | Lanzenberger | 74/424.8 |
| 3,779,355 | 12/1973 | Okuno | 188/185 |
| 4,216,848 | 8/1980 | Shimodaira | 188/184 |
| 4,275,609 | 6/1981 | Delaney | 74/41 |
| 4,372,379 | 2/1983 | Kulhaneic | 166/68.5 |

FOREIGN PATENT DOCUMENTS 0767258  7/1934  France .............................. 188/184

Primary Examiner—Dwight Diehl
Assistant Examiner—Scott Anchell
Attorney, Agent, or Firm—Ronald W. Hind

[57] ABSTRACT

A drive assembly brake is mounted in the gearbox connecting a motor driven input shaft to an output shaft, the output shaft being connected by a tubing string to a submersed rotary pump. The gearbox includes an output shaft housing portion defining an oil chamber and an input shaft housing portion defining an oil-free centrifugal brake chamber. The relatively faster moving input shaft carries a centrifugal brake having weight members frictionally engageable with the brake chamber wall when the rotational speed of the input shaft reaches a sufficiently high degree, and the resulting braking action retards the rotation of the input shaft.

In one embodiments a split casing gearbox is used having matched passage portions in the faces of the connected gearbox portions to form a lubrication passage system for the shaft bearings.

3 Claims, 4 Drawing Sheets

DRIVE ASSEMBLY WITH OVERSPEED BRAKE

BACKGROUND OF THE INVENTION

This invention relates generally to drive assemblies for deep-well submersible pumps and particularly to a gearbox brake used in such drive assembly.

Submersible rotary pumps in down-hole locations are connected to the surface drive assembly by a tubing string which can be of the order of 4,000 feet in length. Such an arrangement is disclosed in U.S. Pat. No. 4,372,379 (Kulhanek et al.) by way of example.

The surface drive assembly includes an electric motor which drives the rotary pump through the medium of the tubing string. In the event that the rotary pump overheats, for example due to the lowering of the oil level, the pump can heat and seize up. When this happens, because of its extreme length, the tubing string can continue to be rotated by the electric motor resulting in the twisting of the string with a consequent build up of torsion forces in the string. When a rotational limit is reached the motor ceased to turn and at this point the torsion built up in the tubing string can act in reverse causing the string to unwind thereby reverse-rotating the motor drive shaft. The forces unleashed when such unwinding occurs can result in the destruction of the surface drive assembly and in extreme cases can causes drive pulleys to literally explode.

In addition to the above, the provision of braking systems for use in conjunction with drive assemblies presents the problem of tampering where the brake system is a separate system and therefore easily accessible as well as being susceptible to moisture penetration. These problems are particularly acute where, as here, the system must be left unattended for long periods of time.

Also adequate lubrication of the shaft bearings is a problem for gearboxes of the type under consideration.

Brakes of various kinds have ben used without solving the problem satisfactorily. The present invention solves the problem in a manner not disclosed in the known prior art.

SUMMARY OF THE INVENTION

In accordance with this invention the gearbox which connects the input shaft and the output shaft of a drive assembly for a rod string is provided with a brake to retard high speed reverse rotation induced into the string following seize up of the submersible pump.

Also in accordance with the invention a split casing or clamshell gearbox is provided having a lubrication passage system consisting of matched passage portions formed in the connected gearbox faces which cooperate to form oil conveying passages when the gearbox portions are connected.

It is an aspect of the invention to provide a gearbox for a right-angularly related input and output shafts and to provide a brake housed within the gearbox to protect the brake from tampering.

It is another aspect of the invention to provide a centrifugal brake which is disposed within the gearbox and provides braking action for the relatively high speed input shaft.

It is yet another aspect of this invention to provide a split casing gearbox which includes spaced input and output shaft bearings and to provide a spiral passage formed from cooperating grooves in each matched gearbox portion which communicates with an oil chamber and to provide lubricating passage means communicating between said spiral passage and said bearings, said lubricating passage means being formed from cooperating grooves in each matched gearbox portion, lubricating oil being pumped from the oil chamber to the bearings by rotation of the output shaft.

DESCRIPTION OF THE PREFERRED EMBODIMENT

Figure 1:
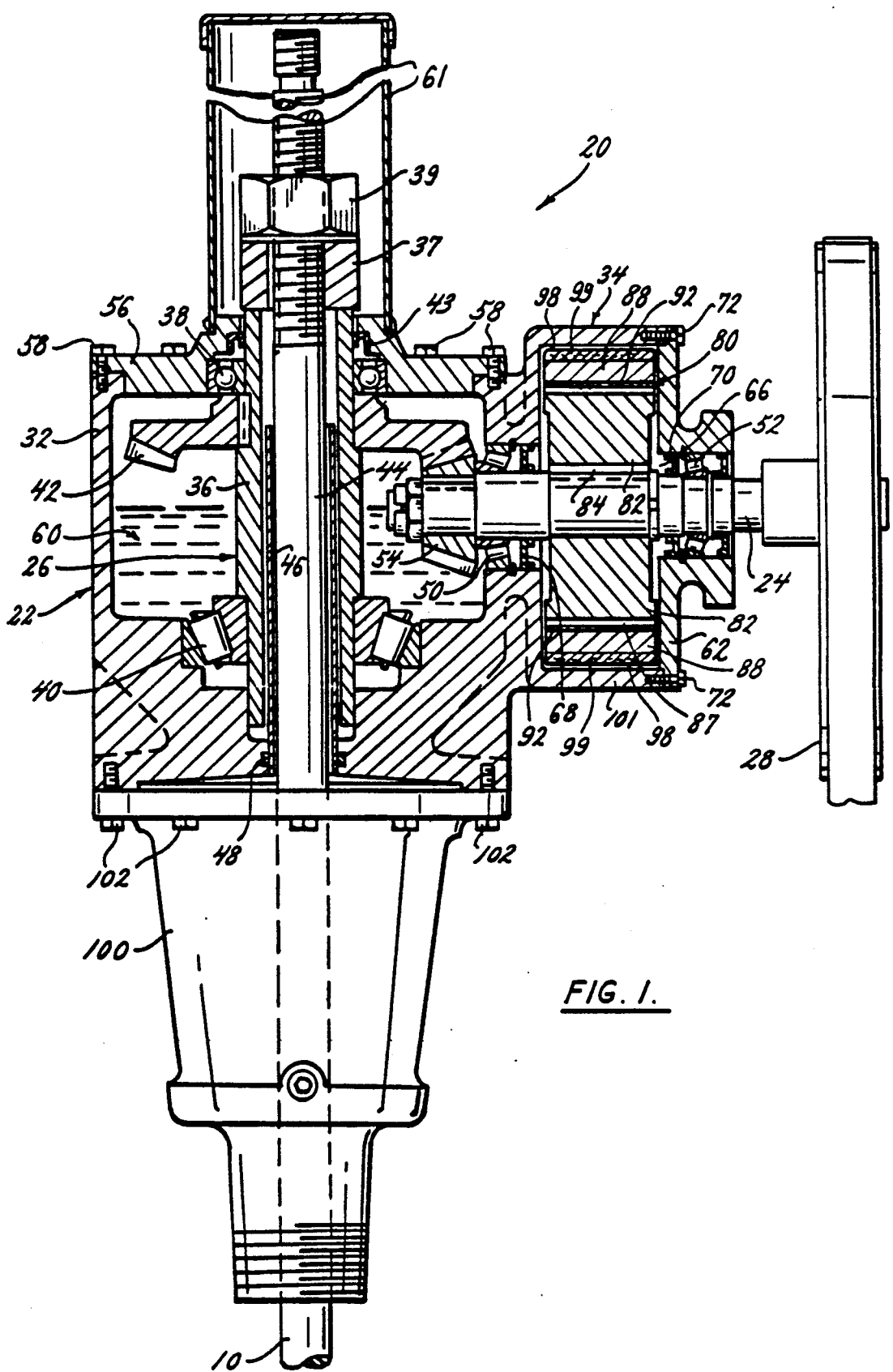
FIG. 1 is a sectional elevational view through the drive assembly gearbox.
Figure 2:
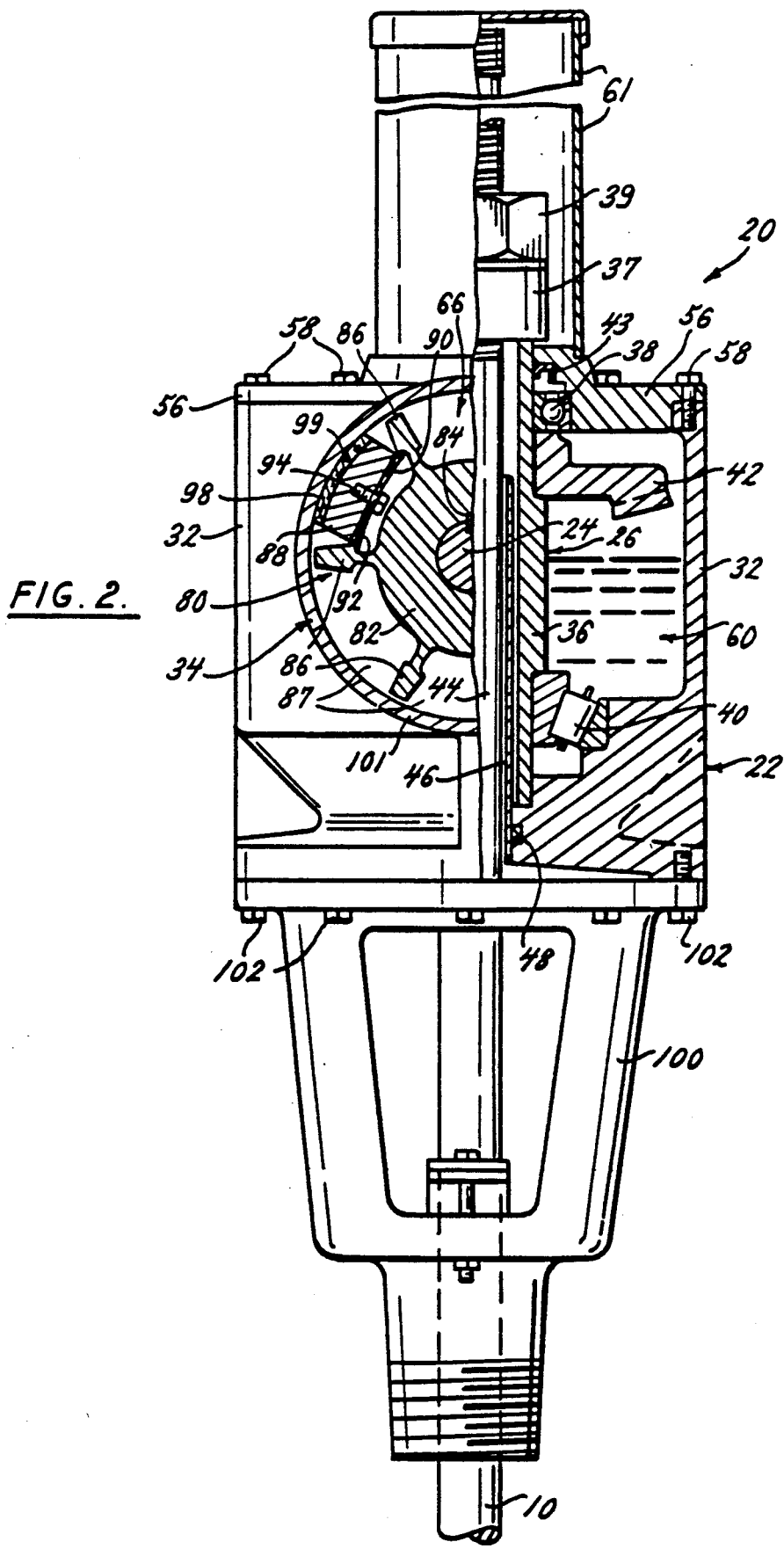
FIG. 2 is a sectional side view taken in part, through the output shaft housing and in part and the input shaft housing.

Referring now by reference numerals to the drawings it will be understood that FIGS. 1 and 2 illustrate a drive assembly generally indicated by numeral 20 which includes a gearbox 22 providing a means for connecting an input shaft 24 to a right-angularly related output shaft 26. The input shaft 24 includes a pulley 28 driven by an electric motor (not shown) and the output shaft 26 is connected to a string of rods 10. The rod string 10 is connected to a submersible pump of the type disclosed in U.S. Pat. No. 4,372,379 which is incorporated herein by reference.

The gearbox 22 includes an output shaft housing portion 32, for the compound output shaft 26, and an input shaft housing portion 34. The ouput shaft 26 includes an outer portion 36, supported by upper and lower bearings 38 and 40, and carries a crown gear 42. A seal 43 is provided above the upper bearing 38. The ouput shaft 26 also includes a coaxial inner portion 44 which rotates with the outer portion and is connected to the outer portion 36 at the upper end, by means of adaptor 37 and lock nut 39. The said adaptor 37 and lock nut 39 are connected to the threaded end of the output shaft inner portion, and said inner portion 44 extends downwardly into a support adaptor 100 which is separately formed from the gearbox 22 and is attached to said gearbox as by bolts 102. The input shaft 24 is supported by inner and outer bearings 50 and 52 and carries pinion gear 54 at its remote end.

An oil stand pipe 46 is disposed coaxially in the space between the inner and outer shaft portions 36 and 44. The stand pipe 46 includes a fixedly attached collar 48 at its lower end by which it is carried by the output shaft housing portion 32. The collar 48 provides a seal such that oil is received within and contained between the stand pipe 46 and the inner face of the output shaft outer portion 36.

The output shaft housing portion 32 is provided with a cover plate 56 attached to said housing portion 32 as by bolts 58, and defines an oil chamber 60. A cylindrical dust cover 61 is provided for the outer end of the output shaft 26 which is attached to the cover plate 56. The input shaft housing portion 34 is provided with a cover plate 62 attached to said housing portion 34, as by bolts 72, and defines an oil-free centrifugal brake chamber 66. The chamber 66 is sealed by inner and outer seals 68 and 70 carried by the input shaft housing portion 34 and extending between said housing portion and said input shaft.

A centrifugal brake 80 mounted in the brake chamber includes a hub portion 82 which is fixedly attached to the input shaft 24 as by key connection 84. A plurality of arms 86, intregally formed with the hub 82 extend radially outwardly from the hub 82, said arms defining shoe compartments 86. The shoe compartments each contain a shoe 88, said shoe including a flat inner face 90 attached to a leaf spring 92, as by bolt 94, and said spring extending between shoulder portions 96 provided on each radial arm 86. The shoe 88 also includes an arcuately formed outer face 98 having a brake lining 99 fixedly attached thereto which is engagable in frictional relation with the brake chamber cylindrical wall 101 of the input shaft housing portion 34, which is compatibly diametrically sized.

In a typical installation the gear ratio between the output shaft crown gear 42 and the input shaft pinion gear 54 is 3:1, the input shaft being driven typically at up to 1500 rpm. In the event that the submersed rotary pump seizes up and locks in place the length of the rod string, typically 4,000 feet, continues to be rotated at its upper end by the electric motor with the result that torsion forces are induced into the rod string. At a certain point the motor is unable to continue to provide sufficient power to rotate the rod string further with the result that the rod string reverses rotation and unwinds at a high speed. This high speed is considerably in excess of the workingr speed of the input shaft with the result that the centrifugal brake shoes 88 move outwardly against the resistance of the springs 92 and the lining 99 engages the brake chamber wall 101 and retards the rotational speed of the input shaft to an acceptable speed. When this is reached the braking action ceases and the shoes return to their original position in which there is a gap between the lining 99 and the wall 101.

The gearbox is not limited to the type shown in FIGS. 1 and 2 but can also be of the split casing or clamshell design as shown in FIGS. 3-6.

Figure 4:
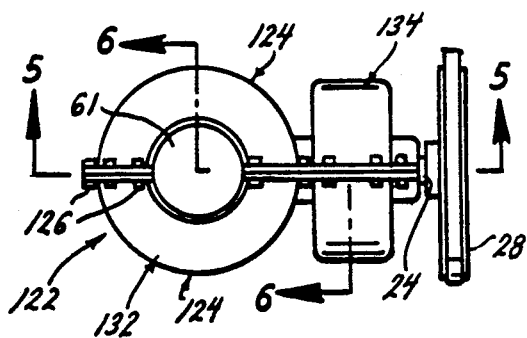
FIG. 4 is a plan view of the gearbox illustrated in FIG. 3.
Figure 3:
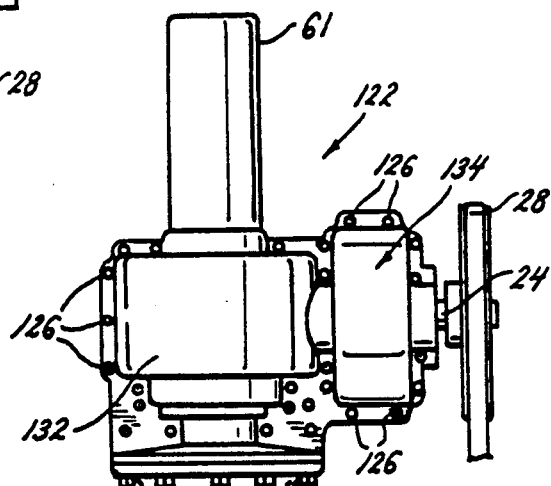
FIG. 3 is an elevational view, reduced in size, of a modified gearbox having a split casing construction.

This type of gearbox indicated by numeral 122 in FIGS. 3 and 4 is made in two matching portions 124, which are connected together as by a plurality of fasteners 126. Cover plates are not required and access to the interior of gearbox 122 is achieved simply by separating the split halves 124. In other respects, the gearbox structural arrangement of parts is essentially the same as with the type of unit shown in FIGS. 1 and 2. In FIGS. 3-6 corresponding reference characters indicate corresponding parts shown in FIGS. 1 and 2.

Figure 6:
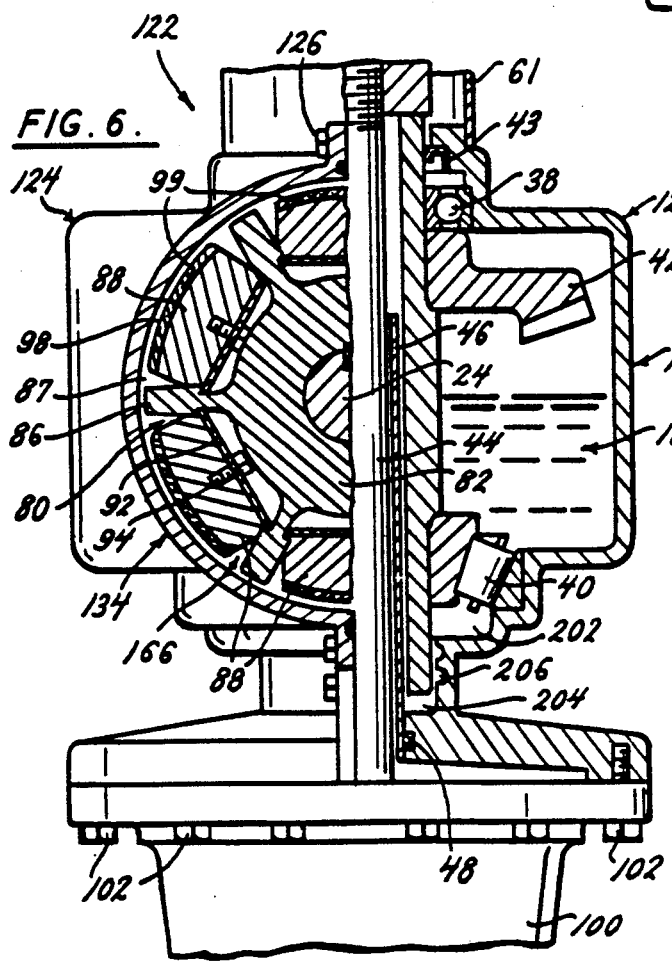
FIG. 6 is a sectional side view taken on line 6—6 of FIG. 4.
Figure 5:
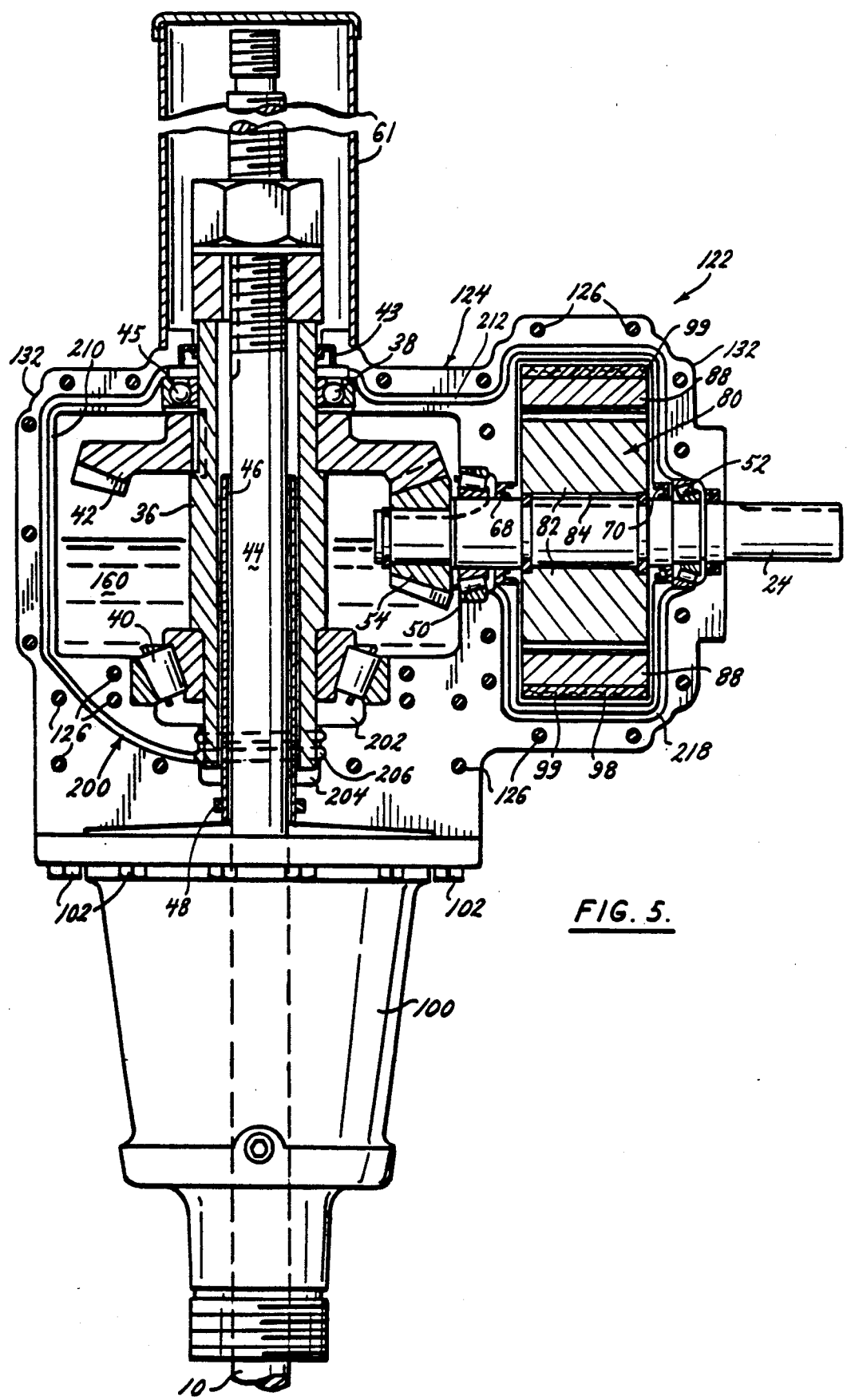
FIG. 5 is a sectional elevational view taken on line 5—5 of FIG. 4.

As shown in FIGS. 5 and 6, the input shaft 24 is housed in gearbox housing portion 134 and the output shaft 26 is housed in gearbox housing portion 132.

The housing portion 132 defines an oil chamber 160 but no cover is required. Similarly, the housing portion 134 defines an oil free centrifugal brake chamber 166 which likewise requires no cover and houses a centrifugal brake 80 as described with respect to the embodiment discussed above. The crown gear and pinion connection is also identical to that described above and the input shaft is supported by bearings 50 and 52 and is provided with seals 68 and 70 and the output shaft 26 is supported by bearings 38 and 40. The bearings for both shafts are seated in semi-circular matched grooves provided in the matched portions of the gearbox.

However, distinguishing from the embodiment described above the split casing provides means of lubricating the input shaft bearings 50 and 52 and the output shaft bearings 38 and 40 which will now be described.

As shown in FIG. 5 the face of each gearbox portion 124 is provided with a lubrication passage system generally indicated by numeral 200 consisting of matched semi-circular passage portions which cooperate to form oil conveying passages when the gearbox portions are connected. Oil is supplied from the oil chamber 160 to the input and output shaft bearings 50, 52 and 38, 40 respectively. An intermediate oil reservoir 202 is provided below the output shaft lower bearings 40 and a lower reservoir 204 is provided below the end of the output shaft 26. The reservoirs 202 and 204 are connected by a spiral passage 206 in the matching gear box portions formed between the two reservoirs. By this arrangement rotation of the output shaft 26 pressurizes oil from the spiral passage 206 to pump it up into the oil lubrication passage system 200.

As shown in FIG. 5 the passage system 200 includes a first branch 210 extending between the spiral passage 206 to the output shaft upper bearing 38 sealed at top and bottom by seals 43 and 45. A second branch 212 leads to the input shaft bearing 52. Branch 218 interconnects input shaft bearings 50 and 52 and, through bearing 50, the oil chamber 160. It will be understood that none of the branches of the passage system 200 communicates with the brake chamber 166 and that seals 68 and 70 prevent ingress of lubricating oil into said brake chamber.

In view of the above it will be seen that various aspects and features of the invention are achieved and other advantageous results obtained. While a preferred embodiment of the invention has been shown and described, it will be clear to those skilled in the art that changes and modifications may be made therein without departing from the invention in its broad aspect.

I claim as my invention:

1. In a drive assembly connecting a motor to a submersible pump by means of a horizontal input shaft connected to the motor and a vertical output shaft rotated at a lower speed by the input shaft and connected to the submersible pump by a tubing string, an improvement comprising:
    (a) a gearbox including a first housing portion carrying the input shaft and a second housing portion carrying the output shaft, the first housing portion including a brake-receiving chamber having a brake shoe engageable surface,
    (b) a brake shoe carried by the input shaft within the brake-receiving chamber and movable radially outwardly under centrifugal force into engagement with said brake shoe engageable surface when the input shaft reversely rotates above a critical speed, and
    (c) means disengaging the brake shoe when the input shaft rotates below the critical speed.

2. A drive assembly as defined in claim 1, in which:
    (d) the disengaging means includes a spring.

3. In a drive assembly connecting a motor to a submersible pump by means of a horizontal input shaft connected to the motor and a vertical output shaft rotated at a lower speed by the input shaft and connected to the submersible pump by a tubing string an improvement comprising:

(a) a gearbox including a first housing portion carrying the input shaft and a second housing portion carrying the output shaft the first housing portion including a brake-receiving chamber having a brake shoe engageable surface, (b) a hub attached to said input shaft within the first housing portion and including a plurality of outwardly extending fingers each defining a weight compartment, and (c) a resiliently mounted brake shoe disposed in each compartment, each shoe being movable radially outwardly under centrifugal force into engagement with said brake shoe engageable surface when the input shaft reversely rotates above a critical speed.

* * * * *